United States Patent
Aalto

[11] Patent Number: 6,041,235
[45] Date of Patent: Mar. 21, 2000

[54] HANDOVER METHOD AND ARRANGEMENT FOR A MOBILE COMMUNICATION SYSTEM

[75] Inventor: Risto Aalto, Riihimäki, Finland

[73] Assignee: Nokia Telecommunications Oy, Espoo, Finland

[21] Appl. No.: 08/727,656

[22] PCT Filed: Apr. 12, 1995

[86] PCT No.: PCT/FI95/00210

§ 371 Date: Oct. 15, 1996

§ 102(e) Date: Oct. 15, 1996

[87] PCT Pub. No.: WO95/28808

PCT Pub. Date: Oct. 26, 1995

[30] Foreign Application Priority Data

Apr. 15, 1994 [FI] Finland ................................ 941779

[51] Int. Cl.[7] ............................................... H04Q 7/22
[52] U.S. Cl. ........................... 455/437; 455/438; 455/525
[58] Field of Search ..................... 455/436, 437, 455/438, 439, 443, 444, 422, 525, 67.1, 226.1, 226.3

[56] References Cited

U.S. PATENT DOCUMENTS

| | | | |
|---|---|---|---|
| 5,239,676 | 8/1993 | Strawczynski et al. | 455/437 |
| 5,239,682 | 8/1993 | Strawczynski et al. | 455/436 |
| 5,285,447 | 2/1994 | Hulsebosch | 455/437 X |
| 5,594,949 | 1/1997 | Andersson et al. | 455/437 |

FOREIGN PATENT DOCUMENTS

| | | |
|---|---|---|
| 490 509 | 6/1992 | European Pat. Off. . |
| 530 165 | 3/1993 | European Pat. Off. . |
| 466 082 | of 0000 | Sweden . |
| 91/16772 | 10/1991 | WIPO . |
| 92/10914 | 6/1992 | WIPO . |
| 92/17053 | 10/1992 | WIPO . |
| 93/26100 | 12/1993 | WIPO . |

*Primary Examiner*—Wellington Chin
*Assistant Examiner*—Philip J. Sobutka
*Attorney, Agent, or Firm*—Pillsbury Madison & Sutro LLP

[57] ABSTRACT

A handover method and arrangement in which a mobile station measures the reception level and the quality of the signal in the serving cell as well as the level of the signal of adjacent cells. The mobile station transmits the measurement results to a fixed network, which determines the need for handover, and, with the aid of the measurement results, selects at least one adjacent cell as a candidate cell for handover. The handover algorithm has been adapted based on the measurement results to estimate the interference level, such as the C/I ratio, in the candidate cell and select the candidate cell for handover so that the possibility of handover to a cell with a high interference level is diminished. Interference level is also used as a criterion in intra-cell handovers.

13 Claims, 2 Drawing Sheets

HANDOVER METHOD AND ARRANGEMENT FOR A MOBILE COMMUNICATION SYSTEM

FIELD OF THE INVENTION

The invention relates to a handover method comprising the steps of:

measuring at a mobile station the reception level, and preferably also the quality of a signal of a serving cell, measuring at a mobile station the reception level of signals of cells adjacent to the serving cell, detecting a need for handover, and selecting with the aid of measurements at least one adjacent cell as a candidate cell for handover.

BACKGROUND OF THE INVENTION

It is characteristic of a modern mobile communication system that it is possible to switch a call from one base station to another while a mobile station is moving from one cell to another within a mobile communication system. This is called handover. So that the need for handover could be detected and a suitable target cell for handover could be selected in a mobile communication system, various measurements of the quality of the connection and field strength in adjacent cells are required. For example, in the pan-European mobile communication system known as GSM (Global System for Mobile Communications), a mobile station (MS) monitors the level and the quality of the signal (downlink signal) received from the base station of the serving cell, as well as the reception level of the downlink signal from the base stations in cells adjacent to the serving cell. Furthermore, the base transceiver station (BTS) of the cell monitors the level and the quality of the signal (uplink signal) received to the base station from every mobile station (MS) that is served by the base station. Handover from the serving cell to an adjacent cell takes place either when (1) the measurement results of the mobile station/base station indicate that the signal level and/or quality in the currently serving cell is low, and a better signal level can be obtained from an adjacent cell, or (2) an adjacent cell allows communication with lower transmission power levels. The latter situation may arise when the mobile station is located in the boundary area of the cells.

The weakness of the decision procedure for handover described above is that the quality of the signals in adjacent cells is a completely unknown factor. The measurements carried out for handover decision described above may indicate that the signal level received from an adjacent cell is sufficient for handover, although the quality of the signal in the adjacent cell is not acceptable for transmission due to co-channel or adjacent-channel interference. Let us assume, for instance, that a call may be handed over from base station BTS1 in a serving cell to that BTS2 in an adjacent cell at two locations; location A and location B. At location A, the transmission of the new base station BTS2 is interfered by the transmission of base station BTS3 belonging to a third cell, as a result the quality of the signal becomes poorer subsequent to the handover. At location B instead, the signal of the interfering base station is weak (due to, e.g., shelter provided by buildings), in which case the quality of the signal will still be sufficient subsequent to the handover if the call is handed over to base station BTS2 at location B.

SUMMARY OF THE INVENTION

The object of the invention is to estimate potential interference in the cells adjacent to the currently serving cell in which the signal level of the adjacent cells is sufficient for handover, and use this estimated information on interference in the selection procedure of the target cell for handover for directing the mobile station to the cell with the best signal quality.

This is achieved with a handover method of the invention which is characterized by estimating an interferece level caused by at least one other cell in said at least one candidate cell if said at least one other cell is a potential source of interference in the candidate cell, utilizing the estimated interference level as an additional criterion for the selection of the target cell for handover so that the possibility of handover to a cell with a high interference level is diminished.

The invention further relates to a handover arrangement in a mobile communication system in which a mobile station measures the reception level, and preferably also the quality, of the signal at the base station of the serving cell, as well as the level of the signals of adjacent cells, and transmits the measurement results to a fixed network, which determines the need for handover, and selects, with the aid of the measurement results, at least one adjacent cell as a candidate cell for handover. The handover arrangement of the invention is characterized in that the handover algorithm of the fixed network has been adapted to estimate, on the basis of the measurement results, the interference level in the candidate cell and select the candidate cell for handover so that the possibility of handover to a cell with a high interference level is diminished.

The invention further relates to a method for controlling intracell handover comprising the steps of:

detecting the need for intracell handover, and selecting one channel of the cell as the candidate for handover. The method is characterized by estimating the interference level caused by at least one other cell on said selected candidate channel if said at least one other cell is a potential source of interference on the candidate channel, and utilizing the estimated interference level as an additional criterion for the handover decision so that intracell handover is not carried out to a channel with a high interference level.

The invention further relates to arrangement for intracell handover in a mobile communication system in which a mobile station measures the reception level, and preferably also the quality of the signal at the base station of the serving cell, as well as the level of the signals of adjacent cells, and transmits the measurement results to a fixed network, which determines the need for intracell handover from one transceiver unit of the base station of the serving cell to another, and selects at least one transceiver unit as a candidate for handover. The arrangement is characterized in that the handover algorithm of the fixed network has been adapted on the basis of the measurement results tc estimate the interference level, such as the C/I ratio, caused by adjacent cells on the channel of the candidate transceiver unit, and take the handover decision so that that intracell handover is not carried out to a transceiver unit the channel of which has a high interference level.

In the invention, the potential interference level, typically the carrier-to-interference ratio, of a candidate cell with a sufficient signal level for handover is determined by comparing the measured downlink signal level of the candidate cell with that of the adjacent cells that may cause co-channel or adjacent-channel interference in the candidate cell. After this, a high probability of interference will diminish the possibilities of a candidate cell to be selected as the target cell for handover so that that the possibility of handover is minimized or even totally prevented to a cell in which the quality of the signal will probably be poor. A low interference level in the candidate cell, or total absence of interference maintains the possibility of the candidate cell for selection unchanged, or even increases it so that the mobile station will be directed to the cell with the best signal quality.

Since a mobile station is usually capable of reporting measurement results only from a limited number of adjacent cells, e.g., from a maximum of six cells, whose signal it receives best, it is possible that these measurement reports contain no information on the cell interfering with the candidate cell, and a direct estimation of the interference level thus cannot be carried out. In accordance with a preferred embodiment of the invention, the interference level in the candidate cell can be estimated by comparing the measured downlink signal level of the candidate cell with those of other adjacent cells, which are called reference cells. In the invention, the term reference cell refers to an adjacent cell that is included in the limited number of adjacent cells measured by a mobile station and possesses, in the service area of the serving cell, a signal profile similar to that of a more remote interfering cell which is not included in the measured cells. The information on the signal level of the interfering cell at the location of the mobile station is obtained by correcting the measured signal level of the reference cell considering the difference in the signal levels between the reference cell and the interfering cell.

BRIEF DESCRIPTION OF THE DRAWINGS

In the following, the invention will be described in greater detail by way of examples with reference to the accompanying drawings, in which.

DETAILED DESCRIPTION OF THE INVENTION

The present invention may be applied in any cellular or trunked mobile communication system, such as the pan-European digital mobile communication system GSM, DCS1800 (Digital Communication System), PCN (Personal Communication Network), UMC (Universal Mobile Communication), UMTS (Universal Mobile Telecommunication System), FPLMTS (Future Public Land Mobile Telecommunication System), etc.

As is well known, in cellular radio networks the geographical area covered by a network is divided into smaller separate radio areas, i.e., cells, so that when located in a cell, a mobile radio station, i.e., a mobile station MS, communicates with the network via a fixed radio station, i.e., a base station BTS, which is located in the cell. Mobile stations may freely move from one cell to another in the area of a mobile communication system. Cell cross-over is merely a re-registration to a new cell when a mobile station has no established call. When a mobile station MS has an established call during a cell cross-over, the call must also be switched from one mobile station to another in such a way that causes the least possible interference to the call. A cross-over during an established call is called handover. Handover may also take place within a cell from one traffic channel to another.

Figure 1:
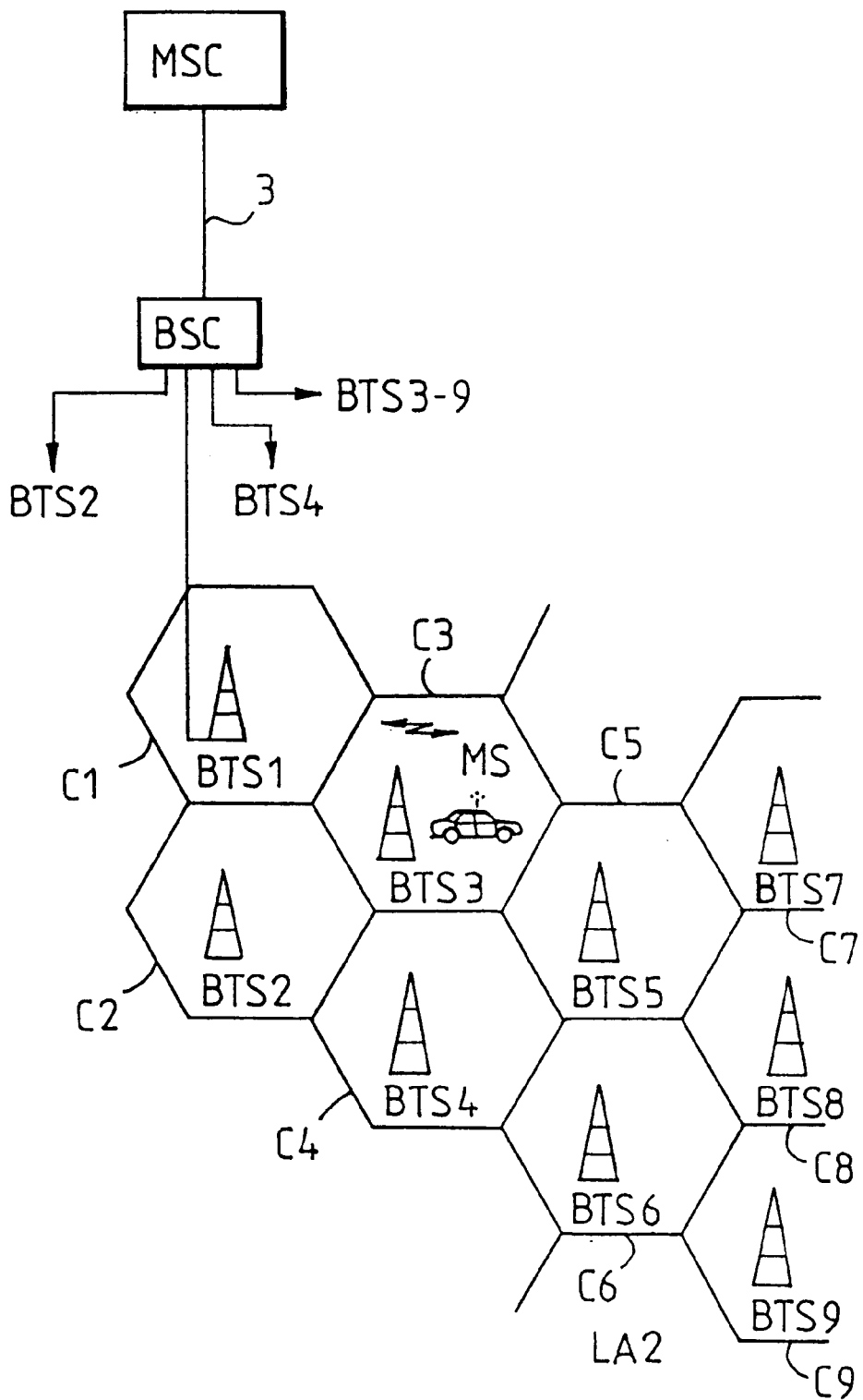
FIG. 1 illustrates a part of a mobile communication system in which the invention may be applied.

FIG. 1 illustrates a mobile communication system in accordance with the GSM system. GSM (Global System for Mobile Communications) is a pan-European mobile communication system, which is becoming a worldwide standard. FIG. 1 shows very briefly the basic structure of the GSM system, not paying close attention to its characteristics or other aspects of the system. GSM system is described in greater detail in GSM recommendations and in "The GSM System for Mobile Communications", M. Mouly & M. Pautet, Palaiseau, France, 1992, ISBN:2-9507190-0-7, which are incorporated herein by reference.

A mobile services switching centre (MSC) is in charge of switching incoming and outgoing calls. It performs similar operations as the exchange of a public switched telephone network (PSTN). In addition, it also performs operations typical of mobile telecommunication only, such as subscriber location management, jointly with the subscriber registers of the network. The GSM system contains at least such subscriber registers as home location register (HLR) and visitor location register (VLR), which are not shown in FIG. 1. More accurate information on the location of the subscriber, such as the accuracy of the location area, are stored in a visitor location register VLR, which is typically one per each mobile services switching centre (MSC). An HLR, in turn, knows the VLR within the area of which a mobile station MS is located. Mobile stations MS are switched to the centre (MSC) by means of base station systems. A base station system comprises a base station controller BSC and base stations BTS. One base station controller BSC is used for controlling several base stations BTS. The operations of the BSC include, e.g., handovers in such cases in which handover is performed within a base station or between two base stations both controlled by the same BSC. FIG. 1 shows for clarity one base station system only, in which a base station controller BSC is connected with nine base stations BTS1–BTS9, having coverages which, in turn, provide corresponding radio cells C1–C9.

Handover decisions during a call are taken by the base station controller BSC based on different handover parameters set for each cell, and the measurement results reported by the mobile station and base stations BTS. Handover is normally made on the basis of the criteria set on the radio path, but a handover may also be carried out for other reasons, such as for distributing the load. Procedures and calculations on which the handover decision is made are called handover algorithms.

For example, in accordance with the technical recommendations of the GSM system, a mobile station MS monitors (measures) the downlink signal level and quality of the serving cell, as well as the downlink signal level of the cells adjacent to the serving cell. The base station BTS monitors (measures) the uplink signal level and quality received from each mobile station MS served by said base station BTS. All measurement results are transmitted to the base station controller. Alternatively, all handover decisions may be taken in the mobile services switching centre MSC, to which the measurement results are also transmitted in this case. The MSC also controls at least such handovers that take place from the area of one base station controller to another.

As a mobile station MS moves in a radio network, handover from the serving cell to an adjacent cell normally takes place either when (1) the measurement results of the mobile station MS and/or the base station BTS indicate that the downlink signal level and/or quality of the currently serving cell is low, and a better signal level may be obtained from some adjacent cell, or when (2) some adjacent cell allows communication with lower transmission power levels, i.e., when the mobile station MS is located within the boundary area of the cells. An effort is made in radio networks to avoid unnecessarily high power levels, and thus interference to other parts of the network.

The base station controller BSC selects, in accordance with the handover algorithm employed in the system, and based on the reported measurement results, those adjacent cells in which the characteristics of the radio path are sufficient for possible handover. These selected adjacent cells from which the final target cell for handover is selected are herein referred to as candidate cells for handover. The simplest way of selecting the target cell is to select the candidate cell with the best characteristics of the radio path, i.e., the best signal level.

It is advantageous, however, to place the candidate cells in an order in accordance with certain priority levels by using other criteria. When priority levels are determined the location of the candidate cell or whether the base station of the candidate cell is controlled by the same base station controller (or MSC) as the serving cell, or by some other base station controller BSC (or MSC) may be taken into account. The load in the cells may also be taken into account when priority levels are determined so that a high load in a cell diminishes the priority of the cell. The serving cell typically has the lowest priority, i.e., intracell handover is performed only if none of the candidate cells is sufficient (as to signal strength conditions) for handover. The main principle in the use of priority levels is that cells with higher priority are preferred to those with lower priority, i.e., a cell has a higher has rank than another cell if it has a higher priority level, even if its signal strength values are lower. When this principle is followed, the measured signal levels play a part in the selection of the target cell from the candidate cells only if two candidate cells have the same priority level.

In accordance with the invention, the estimation of the interference level in the candidate cells for handover is also employed in the handover algorithm prior to the actual handover. The need for estimation of the interference level is due to the fact that although the signal strength (field strength) in the candidate cell is sufficiently high and the cell is thus suitable for the target cell for handover, the cell cannot necessarily provide a high speech quality, since the cell may suffer from interference caused by other cells. In accordance with the invention, the interference levels, usually the carrier-to-interference ratio (C/I) in the candidate cells are estimated in advance, and thus, handovers to cells with high interference levels are prevented. In other words, the basic principle of the invention is to estimate the potential level of co-channel or adjacent-channel interference in each candidate cell and use this information in the selection procedure of the target cell in order to direct the handover of a mobile station to the cell with the best signal quality.

The estimation of the potential C/I ratio is based on a comparison of the measured downlink signal level of the candidate cell with that of at least those adjacent cells that may cause co-channel or adjacent-channel interference in the candidate cell. As shown in FIG. 1, if the serving cell is C1 and the serving base station BTS1, the candidate cell for handover is C2, the base station is BTS2, and the potential interfering cell is C3 (base station BTS3). In this case, the C/I ratio may be obtained from the equation:

$$C/I = RXLEV\_BTS2 - RXLEV\_BTS3, \quad (1)$$

in which RXLEV_BTS2 and RXLEV_BTS3, are the downlink signal levels measured by the mobile station MS at base station BTS2 and, at base station BTS3 respectively. If the downlink signal levels of base stations BTS2 and BTS3 are, e.g., −72 dBm and −90 dBm, respectively, a C/I ratio=18 dB is obtained.

The direct estimation of interference level described above may be applied when the signal levels of any two base stations may be directly compared with each other. In practice, however, a mobile station MS is able to report measurement results only from a limited number (e.g., 6) of adjacent cells whose signals it receives best. In this case, it is possible that the measurement reports transmitted by the mobile station MS to a fixed network, usually to a base station controller BSC, contain no information on the signal level of the cell interfering with the candidate cell, and a direct calculation of the C/I ratio as shown in equation 1 thus cannot be carried out.

Therefore, in a preferred embodiment of the invention, the C/I ratio of the candidate cell for handover is estimated by comparing the measured downlink signal level of the candidate cell with that of certain adjacent cells, referred to as reference cells of the candidate cell. A cell is selected as the reference cell of the candidate cell when the cell is included in the limited number of cells the signals of which mobile station MS receives best, and it possesses in the service area of the serving cell a signal profile similar to that of the cell interfering with the candidate cell. The term signal overspill profile refers to if the interfering signal is shaded by buildings, the signal of the reference cell will be shaded in a similar way. In this case, the measured downlink signal level of the reference cell is proportional to the downlink signal level of the actual interfering cell, and the interference level caused by the interfering cell may be estimated with the aid of the downlink signal level of the reference cell. At the measuring point, there is naturally a difference in the downlink signal levels of the reference cell and the interfering cell, which difference may be due to, e.g., different transmission power levels and different distances to the measuring point. This difference in signal levels must be considered when the signal level is estimated with a suitable parameter, which is set separately for each reference cell. The selection of suitable reference cells and corresponding correction parameters must be carried out by means of research and experiment.

In a preferred embodiment of the invention, the handover algorithm employs the estimation of the interference level only for those adjacent cells for which reference cells have been determined. If some of the reference cells of the candidate cell for handover are not included in the best adjacent cells measured by a mobile station, the handover algorithm will not take these reference cells into account. If a candidate cell has no reference cells at all, estimation of interference level will not be employed in the candidate cell when the target cell for handover is selected. Similarly, if none of the reference cells of the candidate cell is included in the best cells measured by a mobile station, estimation of interference level cannot be carried out in the candidate cell, but the interference level may be assumed to be good. The interference level caused in the candidate cell by an interfering cell which is one of the cells measured directly by a mobile station is naturally determined with direct measurements of the interfering cell without using a reference cell.

Figure 2:
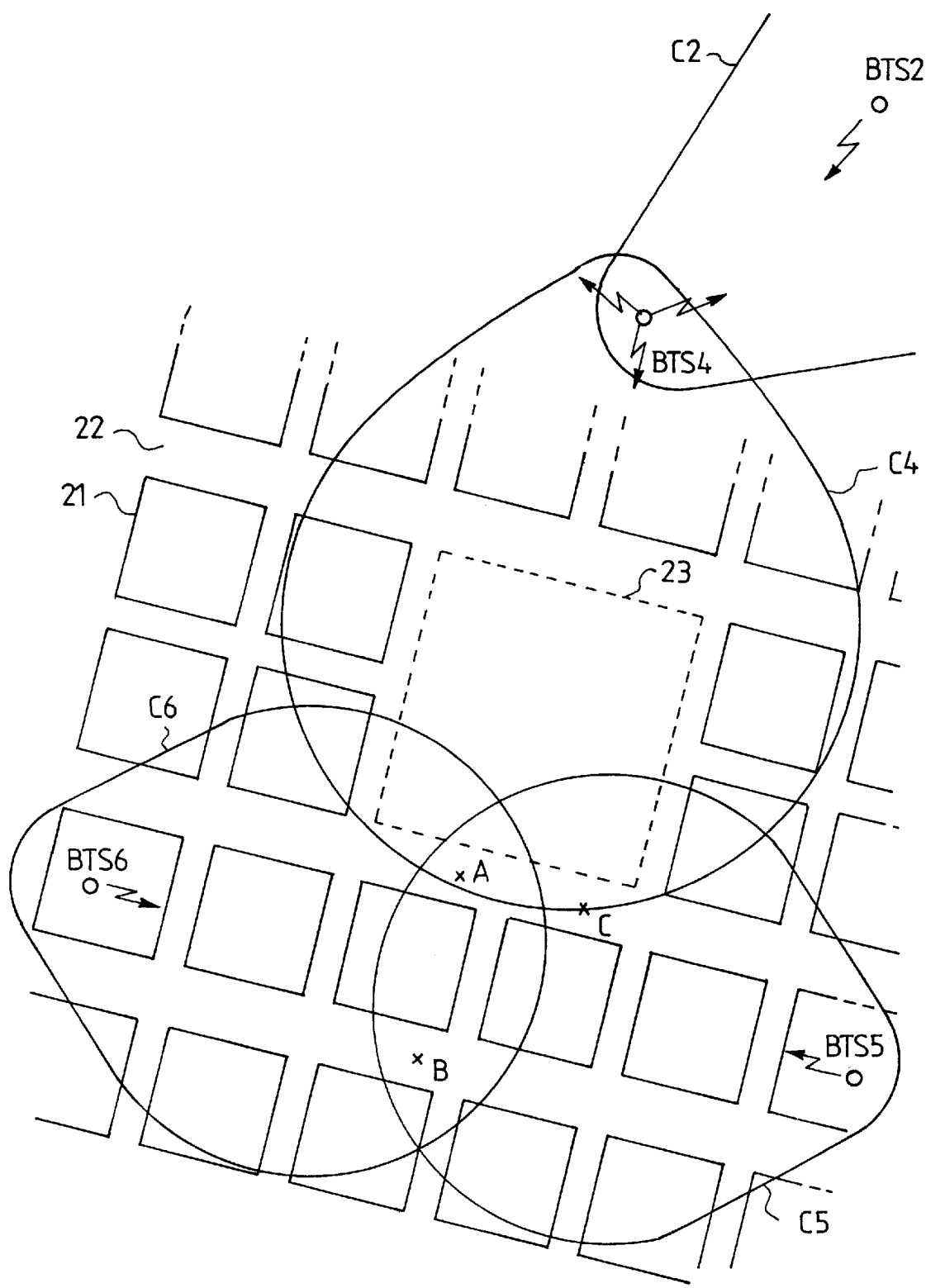
FIG. 2 illustrates the location of a few cells of FIG. 1 in an urban environment.

The estimation of interference levels by means of reference cells in accordance with the invention is further illustrated with an example shown in FIG. 2. FIG. 2 shows cells C2, C4, C5 and C6 of FIG. 1 and corresponding base stations BTS2, BTS4, BTS5 and BTS6 located in an urban environment. Squares 21 represent buildings, areas 22 between them represent streets, and a square 23 marked with a dashed line represents an open space. Three mobile stations MS are approaching an adjacent cell C5 from the serving cell C6 at locations A, B and C. A transceiver station with the absolute radio channel number 90 is located at base station BTS5 in cell C5. Cell C2 has the same frequencies as cell C5. In other words, at base station BTS2 in cell C2, there is a transceiver also having the absolute radio frequency channel number 90. Cell C4 with base station BTS4 is a reference cell of cell C5, having a signal overspill pattern similar to that of cell C2 in cell C5. The Level Adjustment value of the parameter correcting the difference in the signal levels between the interfering base station BTS2 and the reference base station BTS4 is 10 dB.

The potential C/I ratio of cell C5 may be calculated as follows:

Location A

The received signal levels of base stations BTS6, BTS5 and BTS4 are respectively RXLEV_BTS6=−82 dBm, RXLEV_BTS5=−76 dBm, RXLEV_BTS4=−80 dBm. Thus, the estimated C/I ratio is:

$$C/I = RXLEV\_BTS5 - (RXLEV\_BTS4 - LevelAdjustment) = -76 \text{ dBm} - (-80 \text{ dBm} - 10 \text{ dB}) = 14 \text{ dB}.$$

Location B

The received signal levels of base stations BTS6, BTS5 and BTS4 are respectively −82 dBm, −76 dBm, −95 dBm. Thus, the estimated C/I ratio at location B is:

$$C/I = -76 \text{ dBm} - (-95 \text{ dBm} - 10 \text{ dB}) = 29 \text{ dB}.$$

Location C

The received signal levels of base stations BTS6, BTS5 and BTS4 are respectively −88 dBm, −70 dBm, −82 dBm. Thus, the estimated C/I ratio at location C is:

$$C/I = -70 \text{ dBm} - (-82 \text{ dBm} - 10 \text{ dB}) = 22 \text{ dB}.$$

In the case of the example, the reception level of base station BTS5 is substantially the same at all locations. For instance, as to the C/I ratio, at location C, the C/I ratio is so poor that handover to the cell of base station BTS5 is not sensible. Instead, at location B the C/I ratio is sufficiently good so that it is sensible to carry out handover to the cell of base station BTS5.

In practice, it is possible that interference caused by more than one interfering cell must be taken into account in the candidate cell. A handover algorithm may use various estimation methods for estimating potential interference level in signals of several interfering cells. These estimation methods include, e.g., the average value method and the maximum value method. When the average value method is used, the average of the interference levels in all cells interfering with the candidate cell is calculated. The interference levels are obtained directly with formula (1), or indirectly with the aid of reference cells. If some reference cells or interfering cells are more significant than others, it is possible to weight these cells by using cell-specific weighting coefficients. The average interference level or the weighted average interference level calculated in this way is used as the interference level in the candidate cell when the handover algorithm selects the target cell for handover.

In the maximum value method, the interference level caused by each interfering cell in the candidate cell is calculated either directly with formula (1), or with the aid of reference cells. The highest interference level (maximum value) of the interference levels calculated in this way is then selected as the interference level in the candidate cell.

Interference levels estimated in the selection procedure of the target cell for handover are used so that a high potential interference level reduces the probability of the candidate cell to be selected as the target cell so that the possibility of handover is minimized or totally prevented to a cell the signal quality of which would probably be poor. A low interference level or total absence of interference in a candidate cell maintains the possibility of the candidate cell for selection unchanged, or increases it so that the handover of the mobile station will be directed to the cell with the best signal quality.

In a preferred embodiment of the invention, in which the previously described priorities of the candidate cells are used, the estimated interference levels are used together with other factors, such as the load in the cells to affect the preference status of the candidate cells in the selection of the target cells through priority levels of the candidate cells. In a preferred embodiment of the invention, this is carried out so that a low interference level or total absence of interference in a candidate cell maintains the priority level of the candidate cell unchanged, or increases the priority when necessary. A high interference level in the candidate cell lowers the priority level of the candidate cell, or totally removes the candidate cell from the list of handover candidate cells when necessary.

When the priority levels of the candidate cells have been changed based on estimated interference levels, a handover algorithm selects the candidate cell having the highest priority as the target cell for handover. If two candidate cells still have the same priority, the cell with a better signal quality is chosen.

In another embodiment of the invention, the estimation of interference level of the invention is also applied to intracell handover. Several transceiver units each with a different carrier frequency are located at the base station of the cell. A carrier may be used for transmitting one (FDMA systems) or more (TDMA systems) traffic channels. Sometimes, a situation arises in which handover within a serving cell from one transceiver to another is required, e.g., for distributing the traffic load. In accordance with the invention, when need for intracell handover is detected, at least one transceiver is selected as a candidate for handover, and the interference level is estimated on the channel of said transceiver. Estimation is carried out according to the same principle as described above, except that the signal level of the candidate channel of the serving cell and the signal level of the reference cells of the serving cell, and/or that of potential interfering adjacent cells are compared with each other. The levels are measured by the mobile station. If the estimated interference level on the channel in the transceiver exceeds the predetermined threshold value, the handover algorithm will not perform intracell handover to the channel of the transceiver.

The figures and the description referring thereto are only intended to illustrate the present invention. The present invention may vary in its details within the scope and the spirit of the attached claims.

What is claimed is:

1. A handover method, said handover method comprising:
   measuring at a mobile station at least a reception level of a signal of a serving cell;
   measuring at a mobile station a reception level of signals from a limited number of cells adjacent to said serving cell;
   detecting a need for handover;
   selecting with the aid of measurements at least one adjacent cell as a candidate cell for handover;
   assigning, from said adjacent cells to be measured, to at least one candidate cell, one or more reference cells possessing a signal profile similar to that of a more remote cell which is a potential source of co-channel or adjacent channel interference in the respective candidate cell, but which is not directly measurable by said mobile station in said serving cell;
   estimating an interference level caused by at least one other cell in said at least one candidate cell, if said at least one other cell is a potential source of interference in said candidate cell; and
   utilizing said estimated interference level as an additional criterion for selection of a target cell for handover so that a possibility of handover to a cell with a high interference level is diminished.

2. The handover method as claimed in claim 1, said method further comprising:
   preventing handover to a candidate cell having an estimated interference level exceeding a predetermined threshold level.

3. The handover method as claimed in claim 1, wherein utilizing said estimated interference level includes a stepwise change of a priority of said candidate cell in selection of said target cell, in accordance with said interference level in said candidate cell, so that said priority declines as said interference level rises.

4. The handover method as claimed in claim 1, wherein estimation of said interference level is not carried out in a candidate cell to which no reference cell has been assigned.

5. The handover method as claimed in claim 1, said method further comprising:
    estimating a low interference level for said candidate cell, and
    increasing or maintaining unchanged said priority of said candidate cell when measurement results of said mobile station contain no information about said signal level of any reference cell of said candidate cell.

6. The handover method as claimed in claim 1, said method further comprising:
    determining the signal level of an actual interfering cell by correcting said measured signal level of said reference cell, based on a difference in signal levels between said reference cell and said actual interfering cell.

7. The handover method as claimed in claim 1,
    said method further comprising:
    determining directly, without a reference cell, an interference level caused by a potential interfering cell which is one of said adjacent cells directly measurable by said mobile station.

8. The handover method as claimed in claim 1, said method further comprising:
    measuring at said mobile station, said reception level and a quality of said signal of said serving cell.

9. A method for controlling intracell handover, said method comprising:
    detecting a need for intracell handover;
    selecting one channel of said cell as a candidate for handover;
    measuring only a limited number of adjacent cells at said mobile station;
    estimating an interference level caused by at least one other cell on said selected candidate channel, if said at least one other cell is a potential source of interference on said candidate channel;
    assigning from said adjacent cells to be measured, to at least one candidate cell, one or more reference cells possessing a signal profile similar to that of a more remote cell which is a potential source of co-channel or adjacent channel interference in the respective candidate cell, but which is not directly measurable by said mobile station in said serving cell; and
    utilizing said estimated interference level as an additional criterion for a handover decision so that intracell handover is not carried out to a channel with a high interference level.

10. Handover arrangement for intracell handover in a mobile communication system in which a mobile station measures a reception level of a signal of a serving cell as well as a level of signals in adjacent cells, and transmits measurement results to a fixed network, which determines the need for intracell handover from one transceiver unit of a base station of a serving cell to another and selects at least one transceiver unit as a candidate for handover, wherein a handover algorithm has been adapted based on said measurement results to estimate an interference level caused by adjacent cells on a channel of said candidate transceiver unit, and wherein at least one candidate transceiver unit has been assigned from said measured adjacent cells at least one reference cell with an overspill profile similar to that of a more remote cell which is a potential source of co-channel or adjacent-channel interference on said channel of said candidate transceiver unit, but which is not directly measurable by said mobile station in said serving cell, and wherein said handover algorithm is arranged to estimate said interference level on the channels of said candidate transceiver, if said measured adjacent cells include at least one reference cell of said candidate transceiver, and wherein said handover algorithm is arranged to take said handover decision so that intracell handover is not carried out to a transceiver unit whose channel has a high interference level.

11. A mobile communication system, wherein a mobile station is arranged to measure at least a reception level of a signal of a serving cell, as well as a level of signals from a limited number of adjacent cells, and to transmit measurement results to a fixed network, which determines the need for handover and selects, with the aid of said measurement results, at least one adjacent cell as a candidate cell for handover, a handover algorithm being adapted to estimate, based on said measurement results, an interference level in said candidate cell and select a candidate cell for handover so that the possibility of handover to a cell with a high interference level is diminished, and wherein at least one candidate cell has been assigned from said measured adjacent cells at least one reference cell with an overspill profile similar to that of a more remote cell which is a potential source of co-channel or adjacent-channel interference in said candidate cell, but which is not directly measurable by said mobile station in said serving cell, and wherein said handover algorithm is arranged to estimate said interference level in said candidate cell, if said measured adjacent cells include at least one reference cell of said candidate cell, and select a candidate cell for handover so that the possibility of handover to a cell with a high interference level is diminished.

12. The mobile communication system as claimed in claim 11, wherein said handover algorithm estimates a signal level of an interfering cell by correcting said measured reception level in said reference cell, considering the difference in signal levels between said reference cell and an actual interfering cell.

13. The mobile communication system as claimed in claim 11, wherein said mobile station measures said reception level and a quality of said signal of said serving cell.

* * * * *